United States Patent [19]

Moy et al.

[11] Patent Number: 5,633,301

[45] Date of Patent: May 27, 1997

[54] FLAME RETARDANT POLYKETONE COMPOSITION

[75] Inventors: Paul Y. Moy, Fishkill, N.Y.; Gerald R. Alessio, Emerson, N.J.

[73] Assignee: Akzo Nobel NV, Arnhem, Netherlands

[21] Appl. No.: 652,393

[22] Filed: May 23, 1996

[51] Int. Cl.⁶ .................... C08K 5/527; C08K 5/5357
[52] U.S. Cl. .............. 524/100; 524/101; 524/120; 524/145
[58] Field of Search ................ 524/119, 120, 524/141, 145, 100, 101

[56] References Cited

U.S. PATENT DOCUMENTS

| | | | |
|---|---|---|---|
| 3,293,327 | 12/1966 | Hechenbleikner et al. | 524/120 |
| 3,737,485 | 6/1973 | Hechenbleikner | 524/120 |
| 3,808,296 | 4/1974 | Brunetti | 524/120 |
| 3,849,522 | 11/1974 | Hills | 524/120 |
| 3,873,496 | 3/1975 | Hills | 524/120 |
| 4,301,058 | 11/1981 | Neukirchen et al. | 524/467 |
| 4,341,694 | 7/1982 | Halpern | 524/117 |
| 4,761,449 | 8/1988 | Lutz | 524/424 |
| 4,801,625 | 1/1989 | Parr | 524/120 |
| 4,885,318 | 12/1989 | Danforth | 524/433 |
| 4,885,328 | 12/1989 | Danforth | 524/424 |
| 4,921,897 | 5/1990 | Danforth | 524/405 |
| 5,030,674 | 7/1991 | Notorgiacomo | 524/117 |
| 5,204,392 | 4/1993 | Nalepa et al. | 524/101 |
| 5,227,416 | 7/1993 | Knox et al. | 524/101 |
| 5,235,085 | 8/1993 | Telschow et al. | 558/74 |
| 5,237,085 | 8/1993 | Telschow | 558/74 |
| 5,362,898 | 11/1994 | Telschow | 558/74 |
| 5,420,326 | 5/1995 | Telschow | 524/120 |

OTHER PUBLICATIONS

Rudolph D. Deanin "Plasticizers"—Additives for Plastics, vol. 1, State of the Art, ed. Raymond Seymour, 203–217 (1978).

*Primary Examiner*—Veronica P. Hoke
*Attorney, Agent, or Firm*—Richard P. Fennelly; Louis A. Morris

[57] ABSTRACT

The present invention is a flame retardant polyketone polymer composition which comprises: (a) a bicyclic phosphorus flame retardant compound, such as one containing one or more pentaerythritol phosphate alcohol moieties, as exemplified by bis(pentaerythritol phosphate alcohol) carbonate; (b) an intumescent flame retardant compound containing nitrogen and phosphorus, such as melamine phosphate; and (c), optionally, a monophosphate ester compound to enhance the compatibility of the composition in the polymer substrate, such as a liquid aryl-group containing phosphate ester compound or melamine phosphate, and the monophosphate ester compound is triphenyl phosphate.

12 Claims, No Drawings

FLAME RETARDANT POLYKETONE COMPOSITION

BACKGROUND OF THE INVENTION

Linear, alternating polyketones formed by the copolymerization of carbon monoxide with one or more olefins (principally ethylene or ethylene in combination with a small amount of propylene) are attracting considerable recent attention as a novel and useful class of polymer. A number of flame retardant additives have been proposed for these type of polymers including the following:

U.S. Pat. No. 4,761,449 to R. G. Lutz teaches the use of an alkaline earth metal carbonate as a flame retardant for such polymers;

U.S. Pat. No. 4,885,318 to R. L. Danforth et al. advocates the use of organo halide-containing materials as polyketone flame retardants;

U.S. Pat. No. 4,885,328 to R. L. Danforth et al. teaches that an alkaline earth metal hydroxide can be utilized as a flame retardant in polyketone polymers;

U.S. Pat. No. 4,921,897 to R. L. Danforth et al. teaches the use of zinc borate or barium borate as suitable flame retardants for such polymers; and U.S. Pat. No. 5,030,674 to V. J. Notorgiacomo advocates the use of a combination of a thermally stable cyclic phosphonate ester and a polytetrafluoroethylene resin as a polyketone flame retardant system. The phosphonate ester additive is exemplified by the ANTIBLAZE 1045 brand product which is available from Albright & Wilson Inc. The cyclic phosphonate species described in this patent all contain one or more monocyclic moieties.

Flame retardant compositions comprising certain bicyclic phosphorus flame retardant compounds and certain intumescent flame retardant compounds which are suitable for use in certain enumerated polymers, including polyolefins, polyesters, and polyamides, are disclosed in U.S. Pat. No. 4,801,625 to W. J. Parr et al. While such compositions are useful as flame retardants for such application, persons of ordinary skill in the art have additionally desired improved flame retardant compositions which have enhanced processing characteristics with the selected polymer they are intended to flame retard. Processing improvements are exhibited by one or more of the following characteristics: less porous pellets; and a smoother surface characteristic when extruded.

This improvement in the type of flame retardant system described in the aforementioned Parr patent is covered in U.S. Ser. No. 08/638,417, filed Apr. 25, 1996 which describes the use of such a system in polyolefin polymers, in particular. The bicyclic moieties shown in the various flame retardants in the aforementioned patent documents are derived from pentaerythritol phosphate alcohol.

SUMMARY OF THE INVENTION

The present invention relates to a novel flame retardant polyketone composition which comprises: (1) a polyketone polymer and (2) a flame retardant which comprises (a) a bicyclic phosphorus flame retardant compound;

(b) an intumescent flame retardant compound containing nitrogen and phosphorus; and (c), optionally, but preferably, a monophosphate ester compound to enhance the compatibility of the composition in the polyketone polymer substrate.

The bicyclic phosphorus flame retardant compound can be a compound containing one or more pentaerythritol phosphate alcohol moieties, such as bis(pentaerythritol phosphate alcohol) carbonate. The intumescent flame retardant compound containing nitrogen and phosphorus can be melamine phosphate. The monophosphate ester compound can be a liquid aryl-group containing phosphate ester compound, such as isodecyl diphenyl phosphate, or can be a solid aryl-group containing phosphate ester compound, such as triphenyl phosphate.

DESCRIPTION OF THE PREFERRED EMBODIMENTS

The present invention's essential components are, preferably, as described herein below.

THE BICYCLIC PHOSPHORUS FLAME RETARDANT

Included within the definition of possible bicyclic phosphorus flame retardant compounds, which are solid materials, for use as one component of the flame retardant composition of the present invention are the following representative compounds:

Pentaerythritol phosphate alcohol itself, which forms a reagent to manufacture a number of the compounds to be described hereinafter, is one flame retardant which can be selected for use in connection with the present invention.

Bicyclic phosphate ether, ester, and carbonate flame retardants as described in U.S. Pat. No. 4,801,625 to W. J. Parr et al., which is incorporated herein by reference, can be employed and form a preferred class of such component(s) herein. A preferred species is bis(pentaerythritol phosphate alcohol) carbonate which is of the formula:

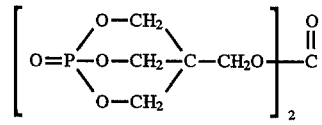

Bis(pentaerythritol phosphate alcohol) hydrogen phosphonate may be used as the pentaerythritol phosphate alcohol-derived flame retardant additive in accordance with the present invention, and it is of the following formula and is described in U.S. Pat. No. 5,420,326:

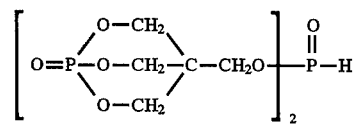

One process for forming the above-described type of compound is by the transesterification of a diphenyl phosphite with pentaerythritol phosphate alcohol which has the formula:

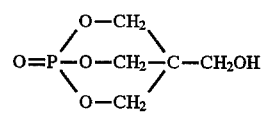

The phosphite reagent is of the formula $(ArO)_2P(O)H$, where Ar is substituted or unsubstituted phenyl. The transesterification reaction is advantageously conducted at elevated temperature (e.g., a temperature of from about 120° C. to about 250° C., preferably in a high boiling organic solvent, such as an aryl phosphate solvent (as described in U.S. Pat. No. 5,237,085), using an appropriate transesterification catalyst (e.g., magnesium dichloride, sodium phenoxide, or the like). The reaction mixture will contain the desired crude product with a phenolic by-product. The crude product can be triturated with a solvent such as acetonitrile or methanol to give the desired, purified product.

Bis(pentaerythritol phosphate alcohol) alkylphosphonate compounds can also be used in the present invention as the pentaerythritol phosphate alcohol-derived flame retardant component. These compounds, which are described in U.S. Pat. No. 5,362,898, are of the formula:

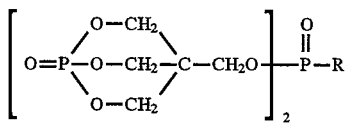

where R is alkyl, for example alkyl of from one to four carbon atoms, preferably methyl. One process for forming the above described compounds is by the transesterification of a diphenyl alkyl phosphonate carrying the desired alkyl group with pentaerythritol phosphate alcohol which has been previously depicted above. The phosphonate reagent is of the formula (ArO)$_2$P(O)R, where Ar is substituted or unsubstituted phenyl and R is alkyl as previously described. The transesterification reaction is advantageously conducted at elevated temperature (e.g., a temperature of from about 170° C. to about 200° C.) in a high boiling organic solvent, such as an aryl phosphate solvent (as described in U.S. Pat. No. 5,237,085), using an appropriate transesterification catalyst (e.g., magnesium dichloride, sodium phenoxide, or the like). The reaction mixture will contain the desired crude product with a phenolic by-product. The crude product can be triturated with a solvent such as acetonitrile or methanol to give the desired, purified product. An alternative way of preparing these compounds is by the reaction of pentaerythritol phosphate alcohol, a trialkylamine, such as triethylamine, and an alkylphosphonic dihalide, such as methylphosphonic dichloride, in an appropriate solvent, such as acetonitrile, under cooling at essentially ambient temperature (e.g., 20° C. to about 30° C.).

Another type of compound that can be used has the following formula and is bis(pentaerythritol phosphate alcohol) pentaerythritol phosphate alcohol phosphonate and has the following formula:

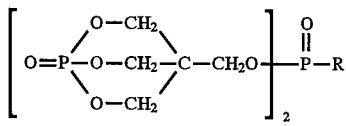

where R in the above formula is derived from pentaerythritol phosphate alcohol and is of the formula:

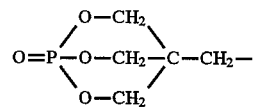

This compound can be formed by a known pentaerythritol phosphate alcohol-triaryl phosphite transesterification reaction followed by Arbuzov rearrangement.

This invention also contemplates use, as the pentaerythritol phosphate alcohol-derived flame retardant, of the (pentaerythritol phosphate alcohol) (cyclic neopentyl glycol) phosphite compound of the formula:

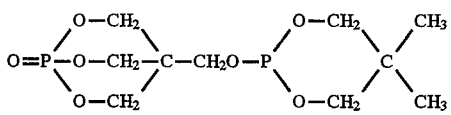

and the (pentaerythritol phosphate alcohol) (cyclic neopentyl glycol) phosphonate compound of the formula:

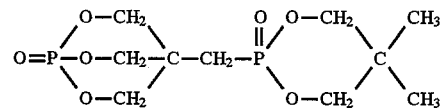

One process for forming the above-described phosphite compound is by the reaction of a neopentylene glycol halophosphite with pentaerythritol phosphate alcohol which has been previously depicted hereinabove. The neopentylene glycol halophosphite reagent is of the formula

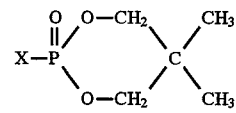

where X is a halogen atom, such as chlorine. The reaction can be conducted at room temperature in an appropriate organic solvent, such as acetonitrile using an acid acceptor, such as a trialkylamine. Once the phosphite compound has been synthesized, it can be converted to the phosphonate compound of the present invention by heating, for example, in a high boiling organic solvent, such as an aryl phosphate solvent.

The above described type of flame retardant component can be used in the present invention of from about 1% to about 30%, by weight of the composition, preferably from about 5% to 12%.

THE INTUMESCENT FLAME RETARDANT

The type of intumescent flame retardant component which also forms a part of the flame retardant which is useful in connection with present invention includes the intumescent phosphorus acid salts of amines or ammonia. They contain both phosphorus and nitrogen atoms. Included within this category of useful reagents for use herein are such phosphates as melamine phosphate (which is preferred), ethylenediamine phosphate, and cyanoguanidine phosphate, such polyphosphates as ammonium polyphosphate, and such pyrophosphates as ammonium pyrophosphate.

This type of intumescent flame retardant additive can be used in amounts ranging from about 5% to about 30% by weight of the composition, preferably from about 15% to about 20%.

THE MONOPHOSPHATE ESTER

This optional additive for the flame retardant composition useful in flame retarding polyketones in accordance with the present invention, as compared to U.S. Pat. No. 4,801,625 to W. J. Parr et al., is a monophosphate ester compound to enhance the compatibility of the known two-component flame retardant in the selected polymer to be flame retarded. Included as useful additives of this type are the aryl group-containing monophosphate esters which can be liquid (such as the alkyl diaryl phosphates, as exemplified by isodecyl diphenyl phosphate), or solid (such as triphenyl phosphate).

The amount of this monophosphate additive which can be used in the compositions of the present invention can range from about 1% to about 30%, by weight of the composition, preferably from about 5% to about 15%.

The compositions of the present invention can be formed by mixing the foregoing additives in such conventional mixing equipment as: single or multiple screw extruders; internal mixers, such as the Banbury mixer; or other melt blending plastic compounding devices.

The weight amount of such flame retardant in the previously described polyketone polymer can, in general, range from about 10% to about 30%, by weight of such polymer.

In addition to the flame retardant composition of the present invention, the selected polyketone to be flame retarded can include one or more other functional additives known to persons of ordinary skill in the art of polymer compounding and processing, including fillers, antioxidants, lubricants, stabilizers, pigments, rheology modifiers, impact modifiers, and antistatic agents.

The present invention is further illustrated by the Examples which follow.

EXAMPLES 1-5

A polyketone formed by polymerizing carbon monoxide and ethylene was compounded with a bicyclic phosphate ester, namely, bis(2,6,7-trioxa-1-phosphabicyclo{2,2,2} octane-4-methanol-1-oxide) carbonate and melamine phosphate at a temperature of about 240° C. in a Haake bowl mixer. The resin was melt blended with a 10 wt %/18 wt % mixture of this bicyclic phosphate ester (doped with about 2 wt % of isopropylphenyl diphenyl phosphate) and melamine phosphate, respectively, and was then compression molded to a thickness of approximately 100 mils. The resultant plaque was cut to specimen size and was then flame retardant tested using the UL-94 flame retardant test protocol. These materials were found to be rated V-O at this thickness with essentially no afterburn time and no dripping. The UL-94 test results were as follows:

| Specimen No. | First Ignition (10 sec.) AFT* | Second Ignition (10 sec.) AFT* | Drip | Rating |
| --- | --- | --- | --- | --- |
| 1 | 0 | 0 | No | V-O |
| 2 | 0 | 1 | No | V-O |
| 3 | 0 | 0 | No | V-O |
| 4 | 0 | 0 | No | V-O |
| 5 | 0 | 0 | No | V-O |

*after burn time

The forgoing Examples, which have been set forth for illustrative purposes only, should not be construed in a limiting sense for that reason. The scope of protection sought is set forth in the claims which follow.

We claim:

1. A flame retardant polyketone composition which comprises: (1) a linear, alternating polyketone polymer formed by the polymerization of carbon monoxide and at least one olefin; and a (2) a flame retardant which comprises (a) a bicyclic, pentaerythritol phosphate alcohol-derived phosphorus flame retardant compound; (b) an intumescent flame retardant compound containing nitrogen and phosphorus; and (c), optionally, an aryl group-containing monophosphate ester compound to enhance the processability of the composition in the polymer substrate.

2. A flame retardant composition as claimed in claim 1 wherein the bicyclic phosphorus flame retardant compound is a compound containing one or more pentaerythritol phosphate alcohol moieties.

3. A flame retardant composition as claimed in claim 1 wherein the bicyclic phosphorus flame retardant compound is bis(pentaerythritol phosphate alcohol) carbonate.

4. A flame retardant composition as claimed in claim 1 wherein the intumescent flame retardant compound containing nitrogen and phosphorus is melamine phosphate.

5. A flame retardant composition as claimed in claim 1 wherein the bicyclic phosphorus flame retardant compound is a compound containing one or more pentaerythritol phosphate alcohol moieties and the intumescent flame retardant compound containing nitrogen and phosphorus is melamine phosphate.

6. A flame retardant composition as claimed in claim 1 wherein the bicyclic phosphorus flame retardant compound is bis(pentaerythritol phosphate alcohol) carbonate and the intumescent flame retardant compound containing nitrogen and phosphorus is melamine phosphate.

7. A flame retardant composition as claimed in claim 1 wherein the monophosphate ester compound is a liquid aryl-group containing phosphate ester compound.

8. A flame retardant composition as claimed in claim 1 wherein the bicyclic phosphorus flame retardant compound is a compound containing one or more pentaerythritol phosphate alcohol moieties, the intumescent flame retardant compound containing nitrogen and phosphorus is melamine phosphate, and the monophosphate ester compound is a liquid aryl-group containing phosphate ester compound.

9. A flame retardant composition as claimed in claim 1 wherein the bicyclic phosphorus flame retardant compound is bis(pentaerythritol phosphate alcohol) carbonate, the intumescent flame retardant compound containing nitrogen and phosphorus is melamine phosphate, and the monophosphate ester compound is a liquid aryl-group containing phosphate ester compound.

10. A flame retardant composition as claimed in claim 1 wherein the monophosphate ester compound is triphenyl phosphate.

11. A flame retardant composition as claimed in claim 1 wherein the bicyclic phosphorus flame retardant compound is a compound containing one or more pentaerythritol phosphate alcohol moieties, the intumescent flame retardant compound containing nitrogen and phosphorus is melamine phosphate, and the monophosphate ester compound is triphenyl phosphate.

12. A flame retardant composition as claimed in claim 1 wherein the bicyclic phosphorus flame retardant compound is bis(pentaerythritol phosphate alcohol) carbonate, the intumescent flame retardant compound containing nitrogen and phosphorus is melamine phosphate, and the monophosphate ester compound is triphenyl phosphate.

* * * * *